April 28, 1925.
W. R. McGOWEN
1,535,171
ADJUSTABLE BUMPER FOR VEHICLES
Filed March 13, 1924
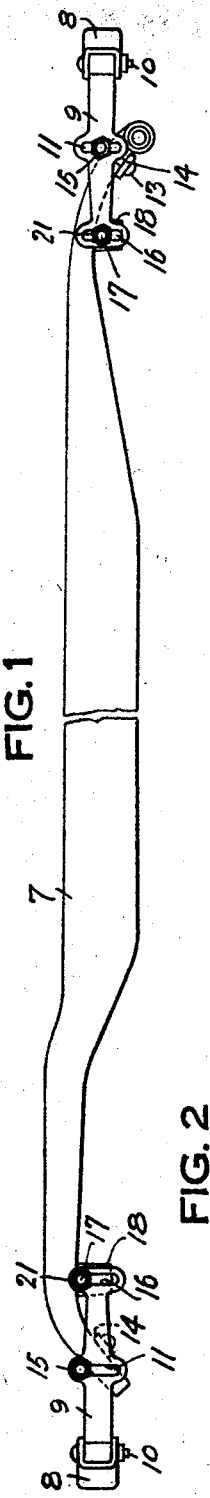
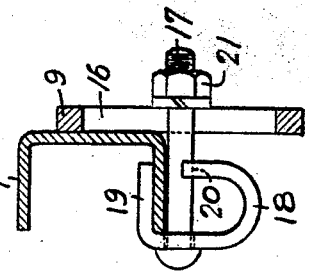
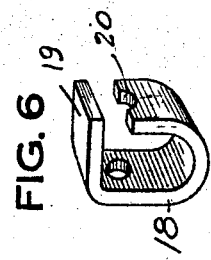
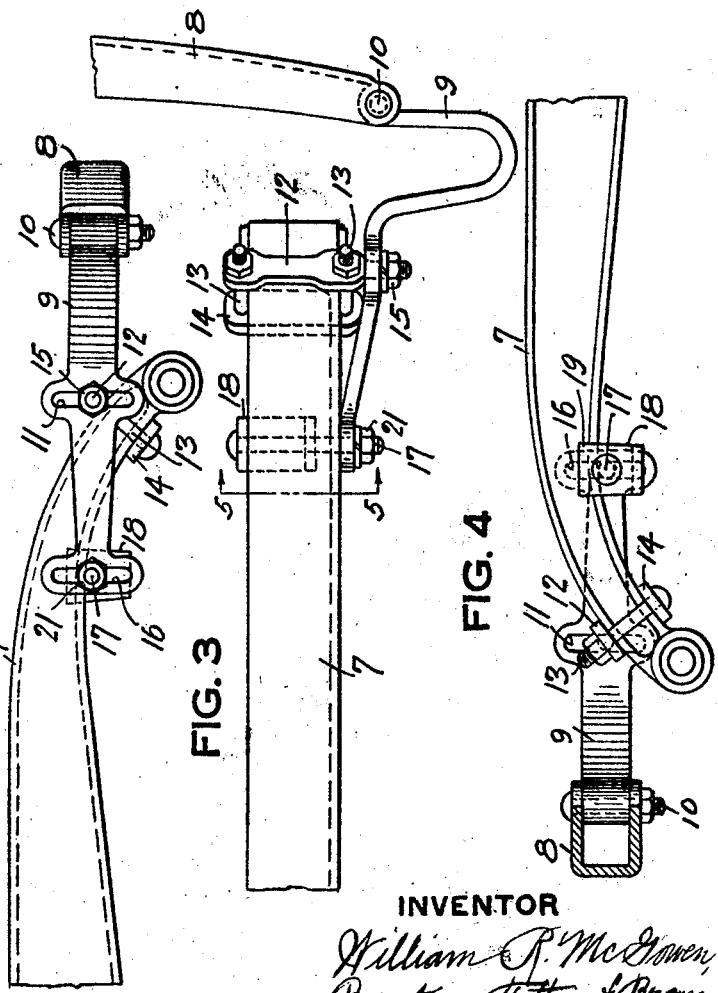
INVENTOR
William R. McGowen,
By Kay, Totten & Brown
Attorneys.

Patented Apr. 28, 1925.

1,535,171

UNITED STATES PATENT OFFICE.

WILLIAM R. McGOWEN, OF CHICAGO, ILLINOIS, ASSIGNOR TO UNITED STATES CHAIN & FORGING COMPANY, OF PITTSBURGH, PENNSYLVANIA, A CORPORATION OF DELAWARE.

ADJUSTABLE BUMPER FOR VEHICLES.

Application filed March 13, 1924. Serial No. 698,980.

*To all whom it may concern:*

Be it known that I, WILLIAM R. McGOWEN, a citizen of the United States, and resident of Chicago, in the county of Cook and State of Illinois, have invented a new and useful Improvement in Adjustable Bumpers for Vehicles; and I do hereby declare the following to be a full, clear, and exact description thereof.

My invention relates to adjustable bumpers for vehicles and particularly to an improved means for positioning the face of a bumper in vertical alignment and to position the bumper as a whole at various heights with respect to the vehicle frame to which it is attached or with respect to another bumper.

Heretofore bumper brackets have been made partially adjustable, in that, particularly in the case of detachable bumper structures suitable for adjustment to vehicle frames of various shapes, provision has been made for positioning the face of the bumper in vertical alignment when attaching it to the vehicle.

But no provision has been made for varying the vertical position of the bumper as a whole, or shifting it bodily.

One object of my invention is not only to provide a bracket whereby the bumper may be so supported that its face is in vertical alignment but wherein it may be bodily adjusted to a desired horizontal plane, particularly with respect to the vehicle to which it is attached, or brought into alignment with another bumper carried upon the same vehicle. By means of my construction I am enabled to position the front and rear bumpers of an automobile in horizontal alignment notwithstanding differences in height of the respective ends of the frame to which the bumpers are attached.

Another object is to simplify and improve generally the structure and arrangement of devices of this character.

One form which my invention may take is shown in the accompanying drawings wherein Fig. 1 is a view, in side elevation, of a portion of one of the side frames of a vehicle to which my invention is applied; Fig. 2 is an enlarged detail view of a portion of the structure of Fig. 1; Fig. 3 is a plan view of the device of Fig. 2; Fig. 4 is an elevational view looking from the opposite side of Fig. 2; Fig. 5 is a view taken on the line 5—5 of Fig. 3; and Fig. 6 is a detail view of one of the attaching members which I employ.

In Fig. 1 I have shown a portion of a channel member 7 forming one of the side frame members of an automobile frame. At each end of the members 7 (only one of which is shown) a bumper bar 8 is supported by means of bracket members 9, there being one of said bracket members at each end of the bumper bar 8. The bracket member 9 is preferably of spring steel and, at its outer end, is provided with an eye portion through which a bolt 10 extends, the eye portion being disposed between flanges of the bumper bar 8 that are perforated to receive the bolt 10.

The bracket member 9 is provided intermediate its ends with an elongated opening 11 through which the threaded end of a clamping plate 12 extends, as shown more clearly in Fig. 3. The plate 12 rests upon the top surface of the frame 7 and is held in place by means of bolts 13 that engage a clamping plate 14 disposed against the under side of the frame 7. The bracket member 9 is adjustable vertically of the clamping plate 12 and is rigidly held in any desired vertical position of adjustment by means of the nut 15.

The bracket member 9 is also provided with a slot 16 through which a bolt 17 extends. The bolt 17, at its one end, is supported by a hook plate 18 of general U form but provided with a bent-over portion 19 that rests upon the lower flange of the channel member 7. The head of the bolt comes opposite the inner edge of the flange referred to and the middle portion thereof rests within a recess 20 (Fig. 6) formed in one leg of the U bolt 18. The fastening device composed of the hook plate 18 and the bolt 17 forms the subject matter of a separate application about to be filed by me.

The inner end of the bracket 9 by reason of the slot 16 has adjustable engagement with respect to bolt 17, and is positioned vertically by means of a nut 21. It will therefore, be seen that the bracket 9 and the bumper bar 8 may be adjusted either about the clamping member 12, or the bolt 17 as a center, or may be bodily shifted vertically. The first-named means of adjustment permits the proper vertical positioning of the face of the bar 8 and the second-named feature of adjustment permits the bar to be positioned vertically with respect to the frame itself or with respect to the bumper at the other end of the frame. The means of adjustment for the bumper bars at both the front and the rear ends of the frame is the same as that above described. Vertically spaced holes may be provided instead of the slots 11 and 16.

Referring more particularly to Fig. 1, the bumper bars are shown as applied to a frame wherein the rear or left-hand end is at a higher elevation than the front end. The front bracket is positioned with the clamping members about midway of the slots 11 and 16 while in order to bring the rear bar 8 into horizontal alignment with the front bar 8, the rear bracket member 9 is supported at its lowermost position, with the clamp-members in engagement with the upper ends of slots 11 and 16.

Not only does the foregoing arrangement provide greater symmetry but the brackets individually may be vertically adjusted to such position that shocks resulting from collisions may be imposed against the vehicle frame at a point most capable of withstanding the strains.

What I claim is:

1. The combination with a vehicle frame and a bumper bar therefor, of means for attaching said bar to said frame, comprising a horizontally disposed bracket member provided with longitudinally spaced perforations, each of the said perforations also extending vertically for a distance to permit of adjustment of said member to various heights, threaded members secured to said frame and extending through said perforations, and clamping nuts engaging the outer ends of said threaded members to clamp the bracket members against said frame.

2. A bracket device comprising a member having longitudinally spaced connecting portions, each of said portions extending vertically for a distance sufficient to permit of vertical adjustment of said device, the said portions being adapted for connection to members to which said device is to be secured.

3. Bracket structure for attachment to a bar having top and bottom faces, comprising a plate adapted to lie across one of said faces, means extending around the other side of said bar for securing said plate in position, a projection on said plate, a bracket arm, and means for securing said bracket arm to said projection.

4. Bracket structure for attachment to a bar having top and bottom faces, comprising a plate adapted to lie across the top of said bar, a plate for engaging the under side of said bar, clamping means for holding said plates in position, an extension formed on one of said plates, a bracket arm, and means for securing said bracket arm to said extension.

In testimony whereof I, the said WILLIAM R. McGOWEN, have hereunto set my hand.

WILLIAM R. McGOWEN.